(12) United States Patent
Tomita

(10) Patent No.: US 11,183,210 B2
(45) Date of Patent: Nov. 23, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Isamu Tomita, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/021,095

(22) Filed: Sep. 15, 2020

(65) Prior Publication Data

US 2021/0295866 A1 Sep. 23, 2021

(30) Foreign Application Priority Data

Mar. 23, 2020 (JP) .............................. JP2020-051115

(51) Int. Cl.
*G11B 5/54* (2006.01)
*G11B 15/087* (2006.01)
*G11B 5/596* (2006.01)

(52) U.S. Cl.
CPC .................................. *G11B 5/596* (2013.01)

(58) Field of Classification Search
CPC .. G11B 5/00; G11B 5/035; G11B 5/52; G11B 15/087; G11B 5/54; G11B 5/56; G11B 5/58; G11B 5/59633

USPC ........ 360/55, 75, 65, 70, 77.06, 72.2, 73.12, 360/77.01
See application file for complete search history.

(56) References Cited

U.S. PATENT DOCUMENTS

| | | |
|---|---|---|
| 6,025,071 A * | 2/2000 | Cameron .............. C08L 53/025 428/355 RA |
| 8,508,880 B2 | 8/2013 | Gao et al. |
| 9,036,304 B1 | 5/2015 | Galbraith et al. |
| 9,251,856 B1 | 2/2016 | Wheelock et al. |
| 9,257,145 B1 | 2/2016 | Soderbloom et al. |
| 9,286,926 B1 | 3/2016 | Dhanda et al. |
| 9,401,167 B2 | 7/2016 | Pokharel et al. |
| 9,576,597 B2 | 2/2017 | Trantham et al. |
| 9,865,291 B1 | 1/2018 | Pokharel et al. |
| 9,972,349 B1 | 5/2018 | French, Jr. |
| 10,418,056 B1 * | 9/2019 | Shen .................. G11B 5/59627 |
| 2016/0267931 A1 | 9/2016 | Trantham et al. |

FOREIGN PATENT DOCUMENTS

JP 2004-62984 A 2/2004

\* cited by examiner

*Primary Examiner* — Nabil Z Hindi
(74) *Attorney, Agent, or Firm* — Allen & Overy, LLP

(57) ABSTRACT

According to one embodiment, the controller of the magnetic disk drive configured to synthesize the first positioning data and second positioning data obtained by the second reader reading the positioning information based on the evaluation data, and performs positioning of the magnetic head based on the synthesized positioning data.

10 Claims, 14 Drawing Sheets

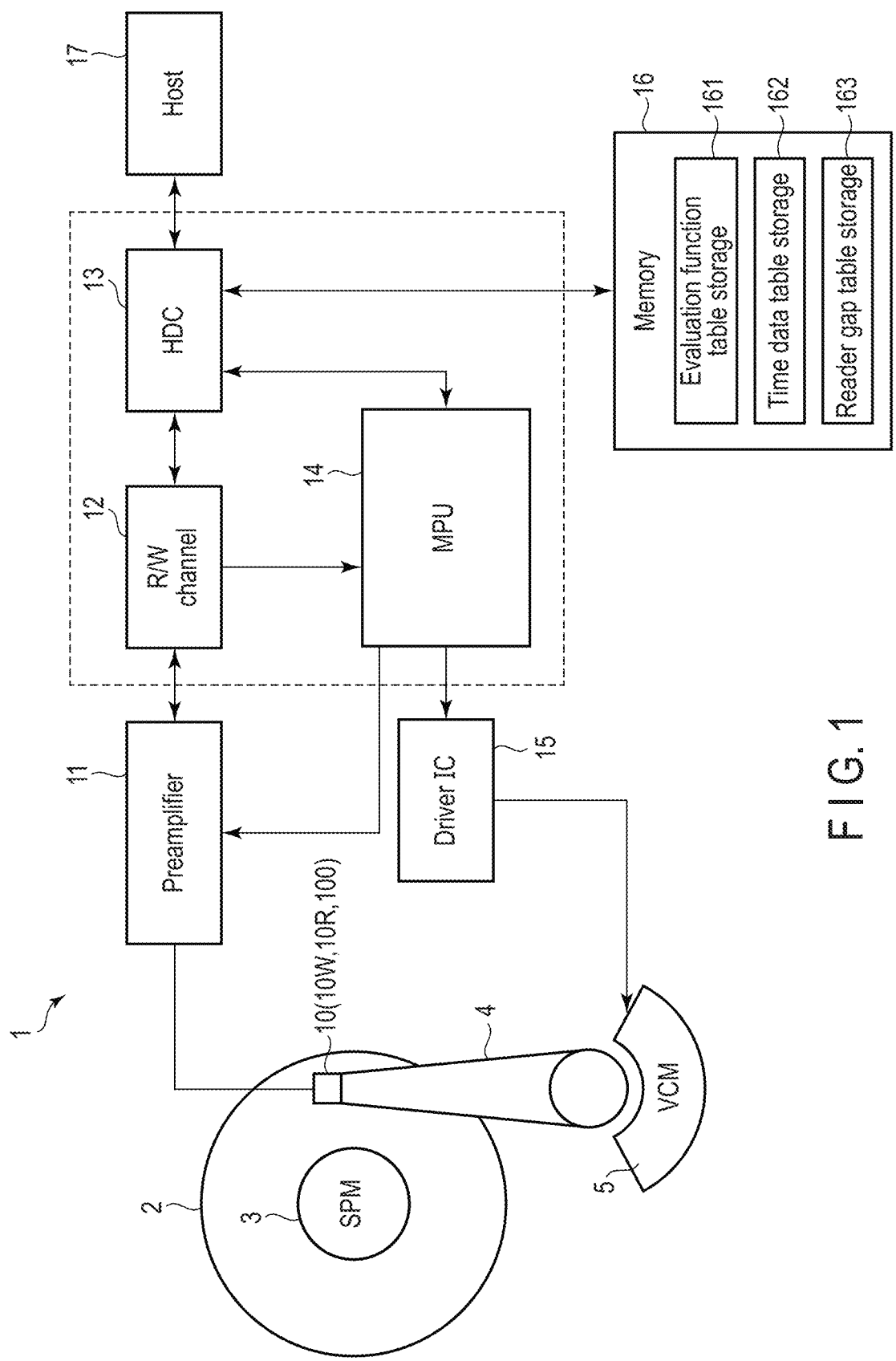
F I G. 1

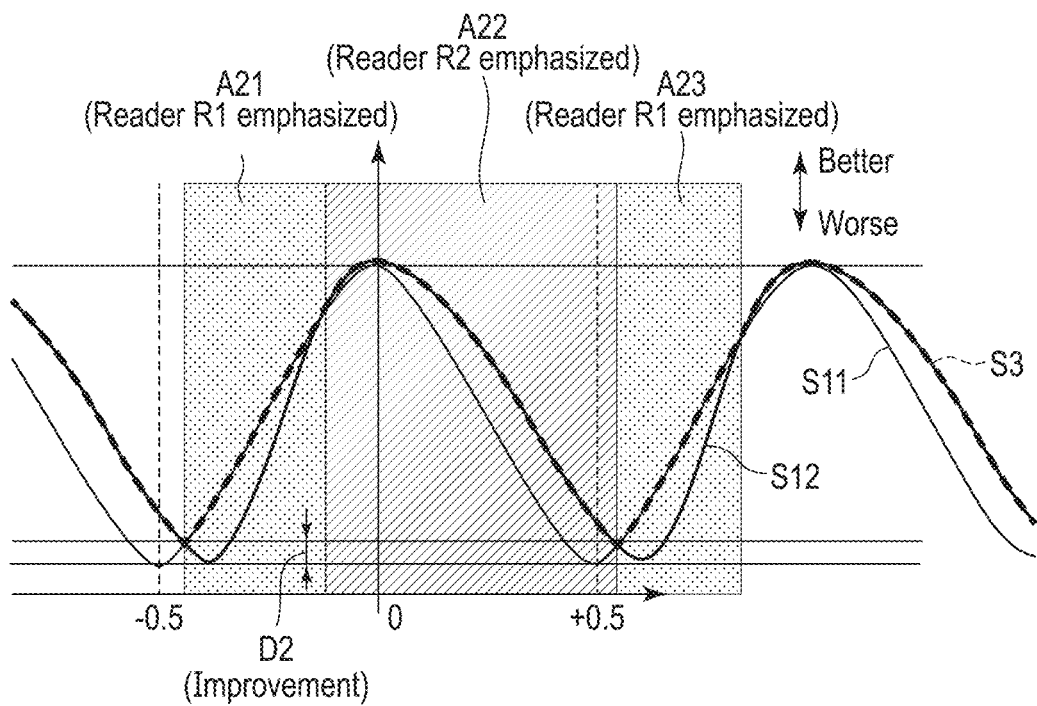
F I G. 11
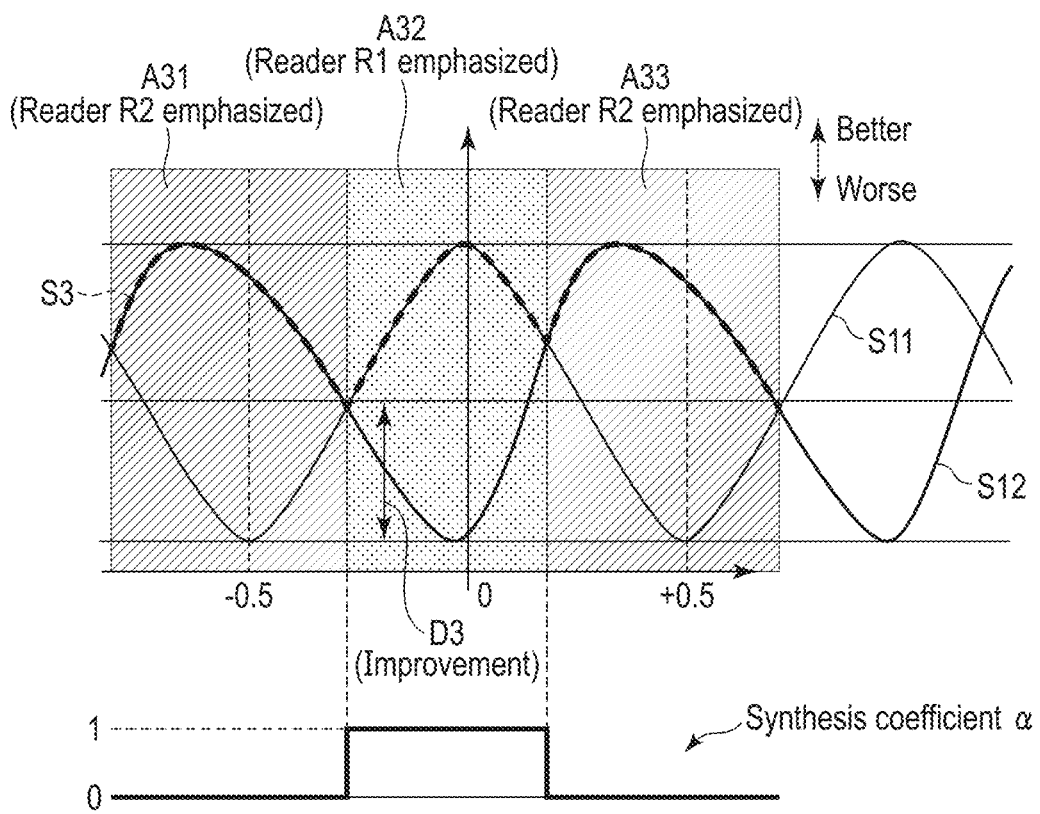
F I G. 12

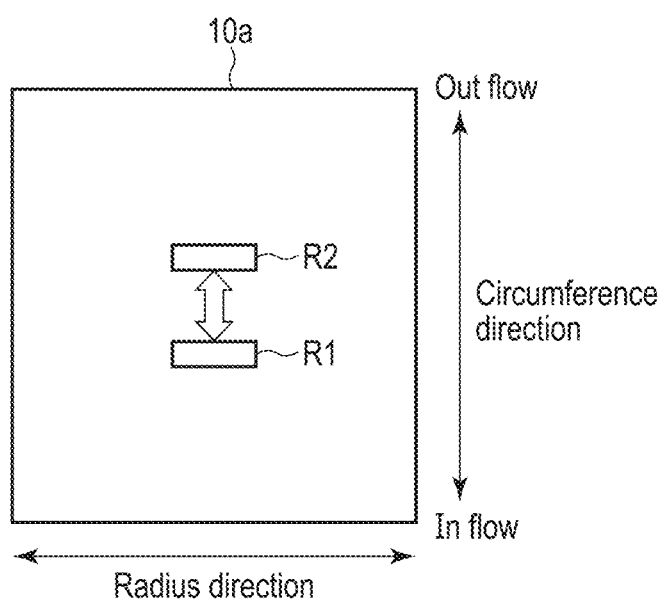
F I G. 19

MAGNETIC DISK DEVICE

CROSS-REFERENCE TO RELATED APPLICATIONS

This application is based upon and claims the benefit of priority from Japanese Patent Application No. 2020-051115, filed Mar. 23, 2020, the entire contents of which are incorporated herein by reference.

FIELD

Embodiments described herein relate generally to a magnetic disk device.

BACKGROUND

There is a known technique for in a magnetic disk device field to use a plurality of magnetic sensors to perform resume with respect to a plurality of recording tracks at the same time in order to achieve a high transfer rate.

The present application would present a technique of suppressing an error in demodulation of positioning data.

BRIEF DESCRIPTION OF THE DRAWINGS

FIG. 1 illustrates an example of the structure of a magnetic disk device of an embodiment.

FIG. 11 illustrates an example of a synthesis pattern in a radius position of the embodiment.

FIG. 12 illustrates an example of a synthesis pattern in a radius position of the embodiment.

FIG. 19 illustrates an example of a variation of the arrangement of readers of the embodiment.

DETAILED DESCRIPTION

Figure 2:
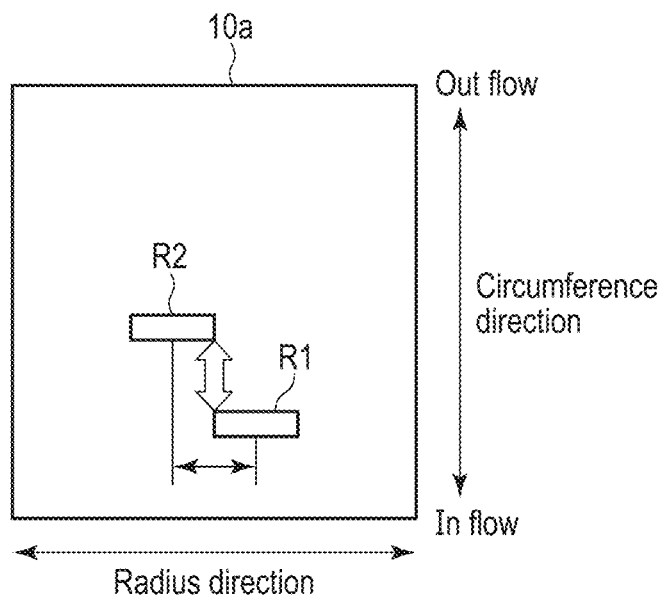
FIG. 2 illustrates an example of arrangement of readers of the embodiment.

In general, according to one embodiment, a magnetic disk device includes a magnetic disk in which positioning information is recorded, a magnetic head including a first reader and a second reader positioned in a different position than the first reader, a controller configured to position the magnetic head based on first positioning data obtained by the first reader reading the positioning information, and a memory configured to store evaluation data at the time of reading the positioning information by each of the first and second readers corresponding to a radius position of the magnetic disk. The controller configured to synthesize the first positioning data and second positioning data obtained by the second reader reading the positioning information based on the evaluation data, and performs positioning of the magnetic head based on positioning data synthesized based on the synthesized positioning data.

Embodiments will be described hereinafter with reference to the accompanying drawings. The disclosure is merely an example, and proper changes within the spirit of the invention, which are easily conceivable by a skilled person, are included in the scope of the invention as a matter of course. In order to make the description clearer, the widths, thicknesses, shapes, etc., of the respective parts are schematically illustrated in the drawings, compared to the actual modes. In the specification and drawings, the same elements as those described in connection with preceding drawings are denoted by like reference numerals, and a detailed description thereof is omitted unless otherwise necessary.

FIG. 1 illustrates an example of the structure of a magnetic disk device 1 of a present embodiment.

As in FIG. 1, the magnetic disk device 1 is, for example, a hard disk drive (HDD), and includes a magnetic disk 2, spindle motor (SPM) 3, actuator 4, voice coil motor (VCM) 5, magnetic head 10, preamplifier IC 11, R/W channel 12, hard disk controller (HDC) 13, microprocessor (MPU) 14, driver IC 15, and memory 16. Furthermore, the magnetic disk device 1 can be connected to a host computer (host) 17. The magnetic head 10 includes a write head (recording head, writer) 10W, read head (resume head, reader) 10R, and spin torque oscillator (STO) 100 which is a high frequency oscillator. Furthermore, in the present embodiment, the read head 10R includes two readers (read elements) of a reader R1 as a first reader and a reader R2 as a second reader. The arrangement of readers R1 and R2 will be explained later with reference to FIGS. 2 and 3. Note that the R/W channel 12, HDC 13, and PU 14 may be incorporated into one integrated circuit.

The magnetic disk 2 is, for example, formed in a circular shape and includes a nonmagnetic substrate. On each surface of the substrate, there are layered a soft magnetic layer formed of a soft magnetic material as an underlying layer, a magnetic recording layer on the soft magnetic layer, which has a magnetic anisotropy in a perpendicular direction to the disk surface, and a protection film layer on the magnetic recording layer. A direction of the magnetic head 1C is an upper direction.

The magnetic disk 2 is fixed to the spindle motor (SPM) 3, and is rotated at a certain speed by the SPM 3. Note that there may be several magnetic disk 2 disposed on the SPM 3. The SPM 3 is driven by drive current (or drive voltage) supplied from the driver IC 15. A data pattern is recorded/resumed to/from the magnetic disk 2 by the magnetic head 10.

The actuator 4 is rotatably disposed and the magnetic head 10 is supported on the tip thereof. The actuator 4 is rotated by the voice coil motor (VCM) 5 such that the magnetic head 10 is moved onto a desired track of the magnetic disk 2 and positioned thereto. The VCM 5 is driven by drive current (or drive voltage) supplied from the driver IC 15.

The magnetic head 10 includes a slider provided with the tip of the actuator 4, and write head 10W and read head 10R formed on the slider. There are several magnetic heads 10 corresponding to the number of magnetic disks 2.

The preamplifier IC 11 supplies a write signal (write current) corresponding to write data supplied from the R/W channel 12 to the write head 10W. Furthermore, the preamplifier IC 11 amplifies a read signal output from the read head 10 and transfers the amplified read signal to the R/W channel 12.

The R/W channel 12 is a signal processor circuit which processes signals related to read/write. The R/W channel 12 includes a read channel to execute signal processing of read data, and a write channel to execute signal processing of write data. There are two read channels corresponding to the two readers R1 and R2. The R/W channel 12 converts a read signal to digital data, and demodulate read data from the digital data. The R/W channel 2 encodes write data transferred from the HDC 13 and transfers encoded write data to the preamplifier IC 11.

The HDC 13 controls data write to the magnetic disk 2 and data read from the magnetic disk 2 via the magnetic head 10, preamplifier IC 11, R/W channel 12, and MPU 14. The HDC 13 structures an interface between the magnetic disk device 1 and the host 17, and executes control of transferring read data and write data. That is, the HDC 13 functions as a host interface controller configured to receive signals transferred from the host 17 and to transfer signals to the host 17. Furthermore, the HDC 13 receives commands (write command, read command, and the like) transferred from the host 17, and transfers the received commands to the MPU 14.

The MPU 14 is a main controller (controller) of the magnetic disk device 1, and executes controls of read/write operations and positioning of the magnetic head 10.

The driver IC 15 controls drive of SPM 3 and VCM 5 in accordance with the control of the MPU 14. According to the drive of VCM 5, the magnetic head 10 is positioned to a target track on the magnetic disk 2.

The memory 16 includes a flash ROM which is a non-volatile memory and a DRAM which is a volatile memory. For example, a flash ROM stores programs necessary for processing in the MPU 14. DRAM is used as a work area and the like. In the present embodiment, the nonvolatile memory of the memory 16 includes an evaluation function table storage 161 configured to store an evaluation function table (evaluation data), and further includes a time data table storage 162, and reader gap table storage 163. The evaluation function table is used in control to follow a track which is subjected to a servo track write (STW) per radius position of a measurement target, wherein the position of the magnetic head 10 is offset with respect to the center of the STW track, a position sensitivity and non repeatable run out (NRRO) are stored therein, the evaluation function table is prepared for each of the readers R1 and R2, and is stored in the evaluation function table storage 161. The time data table storage 162 stores time data which is a shift amount of a time to start reading of servo data between the readers R1 and R2 measured based on a radius position of the magnetic disk 2. Note that the time data may be, for example, a result of measurement of a shift amount of a time to start reading of the readers R1 and R2 (cf., FIG. 7); however, instead of the measured shift amount itself, a size index of the shift amount with respect to a certain threshold may be used. The reader gap table storage 163 stores data of gap between readers as a reader gap between the readers R1 and R2 in reading of the servo data, the data measured based on a radius position of the magnetic disk 2. The time data and the reader gap will be explained later with reference to FIGS. 7 and 8.

FIG. 2 illustrates an example of arrangement of the readers R1 and R2 of the magnetic head 10. In FIG. 2, the arrangement of the readers R1 and R2 is viewed from a recording surface 10a side of the magnetic head 10. As in FI. 2, the readers R1 and R2 are arranged to shift from each other in the circumference and radius directions in the present embodiment. The data are read by the readers R1 and R2 from the lower side of the figure, and thus, the same data are read first by the reader R1 chronologically than does the reader R2.

Figure 3:
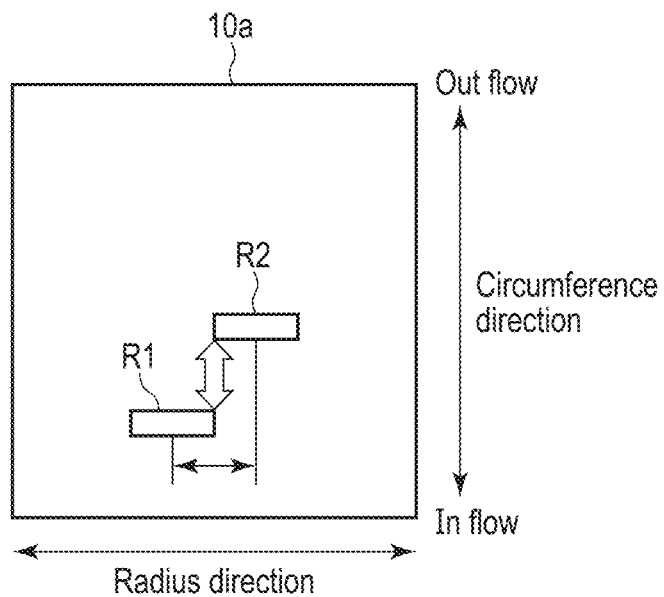
FIG. 3 illustrates an example of arrangement of readers of the embodiment.

FIG. 3 illustrates an example of a variation of the arrangement of the readers R1 and R2. As compared to the example of FIG. 2, the readers R1 and R2 are shifted in the opposite side in the radius direction. Note that the both surface of the magnetic disk 2 are recording surfaces 10a in the magnetic disk device 1, and if the magnetic head 10 is provided with each of the recording surface, the readers R1 and R2 may be arranged such that one of the recording surfaces 10a is arranged as in FIG. 2 while the other recording surface 10a is arranged as in FIG. 3.

Figure 4:
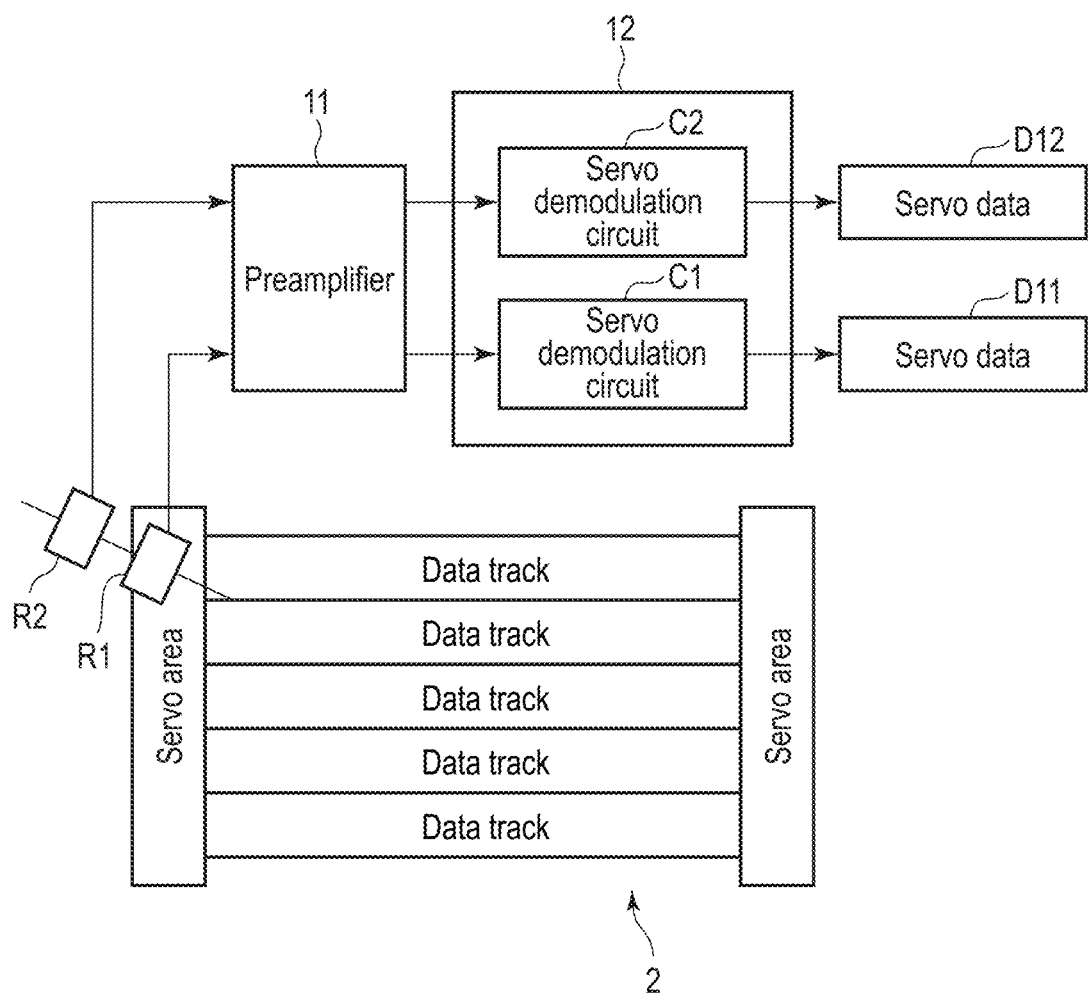
FIG. 4 illustrates an example of a flow of reading servo data of the embodiment.

FIG. 4 illustrates an example of a flow of reading servo data (positioning data) from the readers R1 and R2.

As in FIG. 4, the magnetic disk 2 includes a plurality of data tracks, and a servo area in which servo data indicative of a position of the magnetic disk 2 is provided with the data tracks at a certain interval. The readers R1 and R2 are arranged in the recording surface 10a side of the magnetic head 10 to be shifted from each other in the circumference and radius direction, as explained with reference to FIG. 2. Thus, times of reading the servo data from the data tracks are shifted chronologically. Furthermore, as the readers R1 and P2 are arranged to be shifter in the radius direction, ranges of reading data are different. That is, ranges of reading are shifted from each other in the width direction of the data track. Signals read by the readers R1 and R2 are input in and amplified by the preamplifier 11, respectively, and are demodulated by the R/W channel 12. The signals read by the reader R1 are demodulated by a servo modulation circuit C1 and become servo data D11. Furthermore, the signals read by the reader R2 are demodulated by a servo demodulation circuit C2 and become servo data D12. When the readers R1 and R2 are used, the MPU 14 generally executes a positioning control of the magnetic head 10 using the aforementioned readers R1 and R2; however, in the present embodiment, the MPU 14 synthesizes generation waveforms of servo data read by the readers R1 and R2, and executes the positioning control of the magnetic head 10 using the synthesized generation waveforms.

Figure 5:
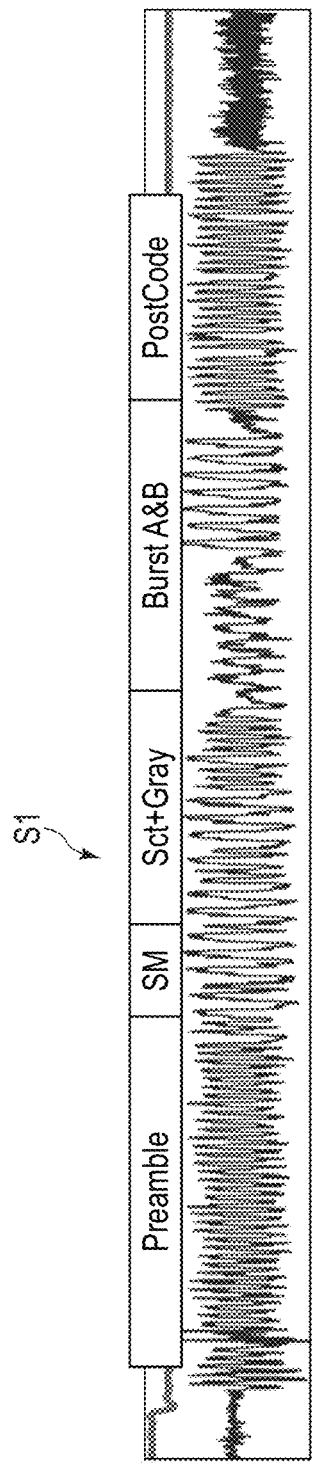
FIG. 5 illustrates an example of generation waveform of servo data of the embodiment.

Here, an example of generation waveforms generated by the readers R1 and R2 will be explained. FIG. 5 illustrates an example of generation waveforms of servo data (hereinafter will be referred to as servo generation waveform).

As in FIG. 5, generation waveform S1 of servo data includes various information pieces. The various information pieces are, in the present embodiment, Preamble, Servo Sync Mark (SM), Sct+Gray, BurstA&B, and POstCode. Main information pieces will be explained here. Preamble (first detection signal, second detection signal) is to set an amplitude and a phase of servo data signals, SM is information indicative of a start of servo data, and Servo Sync Mark is used as identification of servo data upon detection thereof and as a trigger to read subsequent servo data. Set of Sct+Gray indicates a position in the circumference direction, and Gray indicates a track (radius direction of the magnetic disk 2). BurstA&B is information of a position in the radius direction indicative of a position on the magnetic disk 2 with accuracy higher than the track. PostCode is correction information. The correction information if an amount of correction of a shift of the magnetic head 10 during the positioning. Thus, the position information is defined by BurstA&B and PostCode; however, in the present embodiment, the position information is identified by BurstA&B for simpler explanation.

Figure 6:
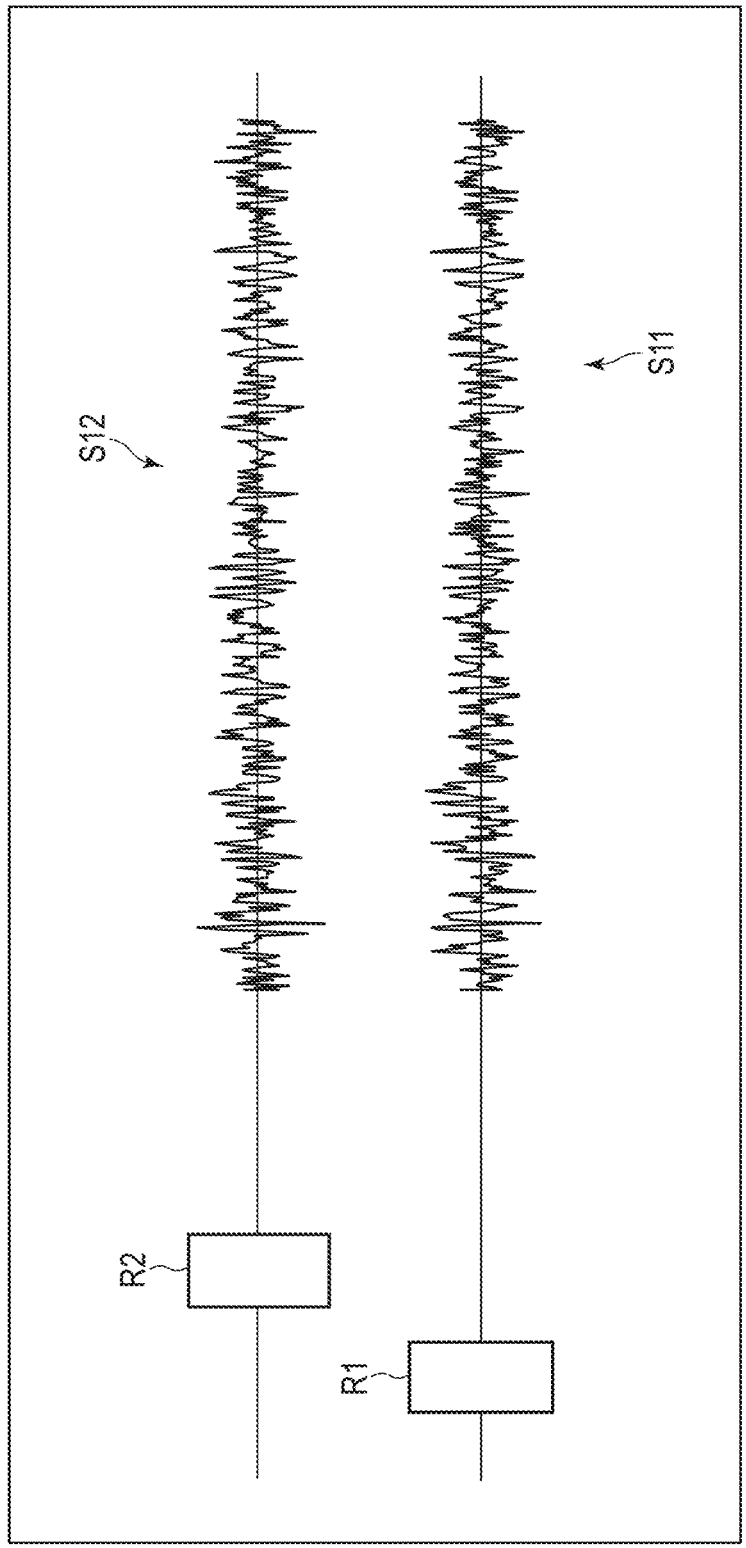
FIG. 6 illustrates an example of servo generation waveform generated by the readers of the embodiment.

FIG. 6 illustrates an example of servo generation waveforms generated by the readers R1 and R2. As in FIG. 6, a servo generation waveform (first positioning data) S11 is generated by the reader R1, and a servo generation waveform (second positioning data) S12 is formed by the reader R2. In the present embodiment, the reader R1 positioned in the circumference direction first reads the servo data, and thus, the reader R1 is a main reader. Note that, although this is difficult to observe in the figure, the generation waveforms S11 and S12 are formed to be asymmetric in the upper side and the lower side of the figure.

Now, a result of measurement of a shift in time with respect to a cylinder (in other words, a radius position) caused by a shift in the positions of the readers R1 and R2 as in FIG. 2 will be explained with reference to FIG. 7, and a result of measurement of a gap between the readers P1 and R2 will be explained with reference to FIG. 8. Note that a shift of the reader R2 with respect to the reader R1 in the radius direction can be obtained by measuring a one-round average value of the position information of the reader R2 in the radius direction when the reader R1 performs a virtual circle control.

Figure 7:
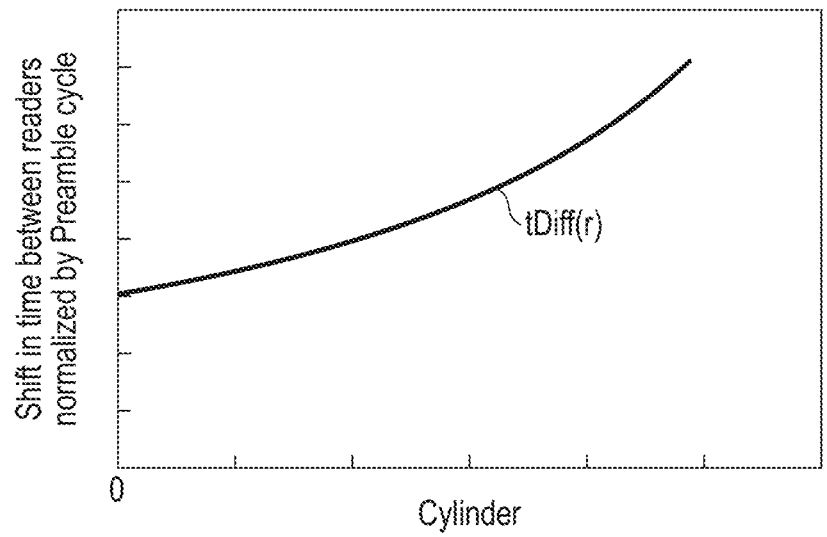
FIG. 7 illustrates an example of time data of the embodiment.

FIG. 7 is an example of time data, and illustrates an example of a time shift (shift in times to start reading) between the readers normalized by a preamble cycle with respect to the cylinder. In FIG. 7, the horizontal axis is a cylinder and the vertical axis is a time shift between the readers normalized by the preamble cycle. Furthermore, the horizontal axis indicates that a radius position of the magnetic disk 2 is great in the left side of the figure and is small in the right side of the figure. As in FIG. 7, when the radius position becomes smaller, time shift tDiff(r) becomes greater.

Figure 8:
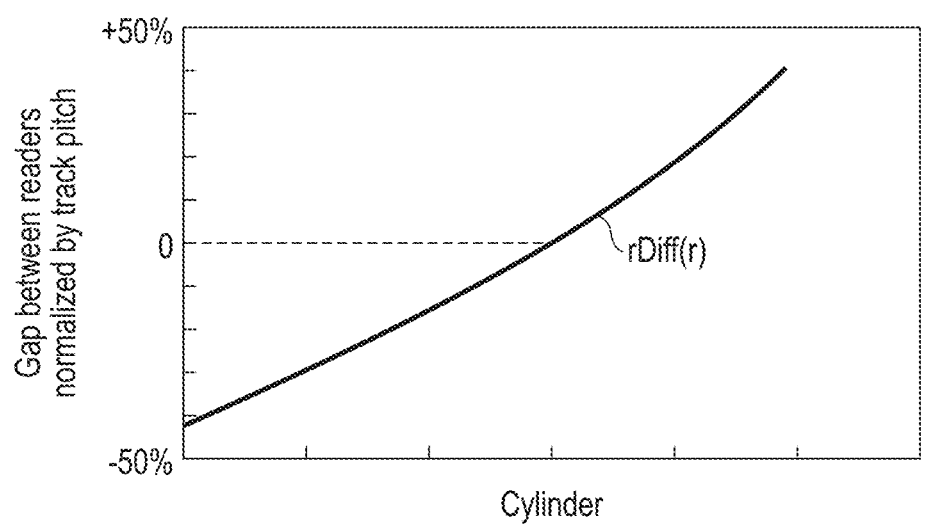
FIG. 8 illustrates an example of a gap between the readers normalized by a track pitch with respect to a cylinder of the embodiment.

FIG. 8 illustrates an example of a gap between the readers normalized by a track pitch with respect to a cylinder. In FIG. 8, the horizontal axis is a cylinder, and the vertical axis is a gap between the readers normalized by a track pitch (center of STW track is zero). The horizontal axis indicates that a radius position of the magnetic disk 2 is great in the left side of the figure and is small in the right side of the figure as in FIG. 7. As in FIG. 8, when the radius position of the cylinder is zero, the normalized reader gap rDiff(r) is approximately −40%, and when the radius position of the cylinder is in approximately the center, the normalized gap rDiff(r) becomes zero, and furthermore, when the radius position of the cylinder is minimum, the reader gap rDiff(r) is approximately +40%.

In the present embodiment, the readers R1 and R2 are shifted from each other as in FIG. 2, and thus, a shift in times with respect to the cylinder occur, and a gap between the readers R1 and R2 occurs. In the present embodiment, a time shift tDiff(r) and a gap between the readers rDiff(r) are measured and stored in the time data storage 142 and the reader gap table storage 163, respectively. For example, values of tDiff(r) and rDiff(r) of a plurality of radius positions (for example, 32 positions) are stored, and the MPU 14 executes linear interpolation from each value in the use time to reproduce a function, and derives tDiff(r) and rDiff(r) of a desired radius position.

Now, a mechanism of synthesis of servo generation waveforms S11 and S12 will be explained. The MPU 14 refers to the evaluation function table of two readers R1 and R2 using a gap from the center of the STW track as a parameter, and emphasizes one with better characteristics of position signal of two readers R1 and R2, and synthesizes the servo generation waveforms S11 and S12.

Figure 9:
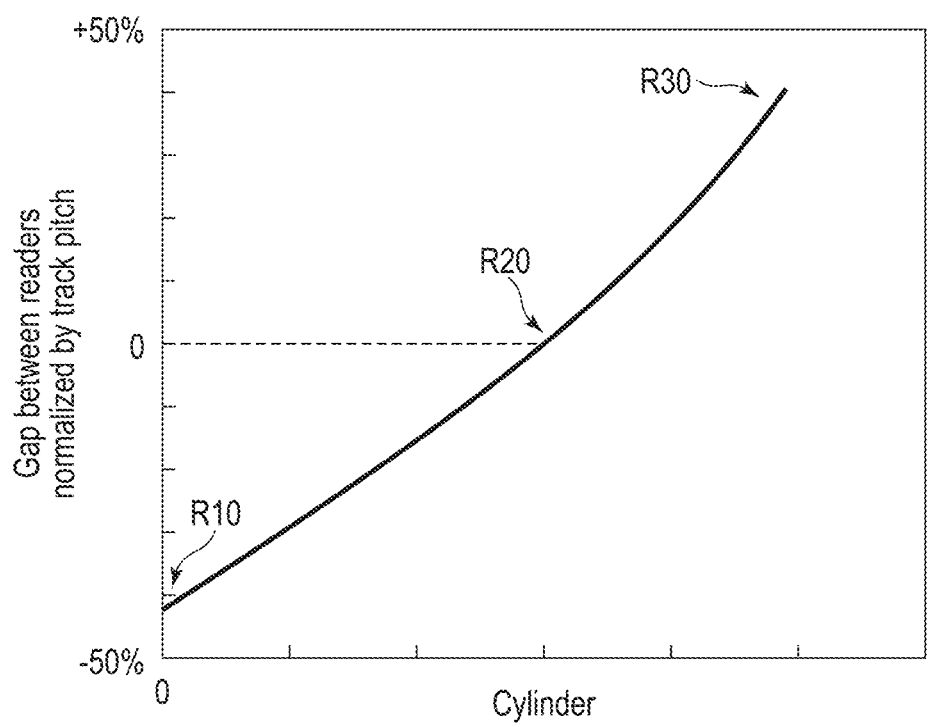
FIG. 9 illustrates three radius positions of a pattern of a mechanism to synthesize servo generation waveforms of the embodiment.

FIG. 9 is the sane as FIG. 8, and illustrates three radius positions R10, R20, and P30 used to explain a pattern of the mechanism to synthesize the servo generation waveforms S11 and S12. At the radius position R10, the radius position of the cylinder is maximum, and the normalized reader gap is approximately −40%. At the radius position R20, the radius position of the cylinder is approximately center, and the normalized reader gap is zero. At the radius position R30, the radius position of the cylinder is minimum, the normalized reader gap is approximately +40%. Hereinafter, three synthesis patterns will be explained with reference to FIGS. 10 to 12.

Figure 10:
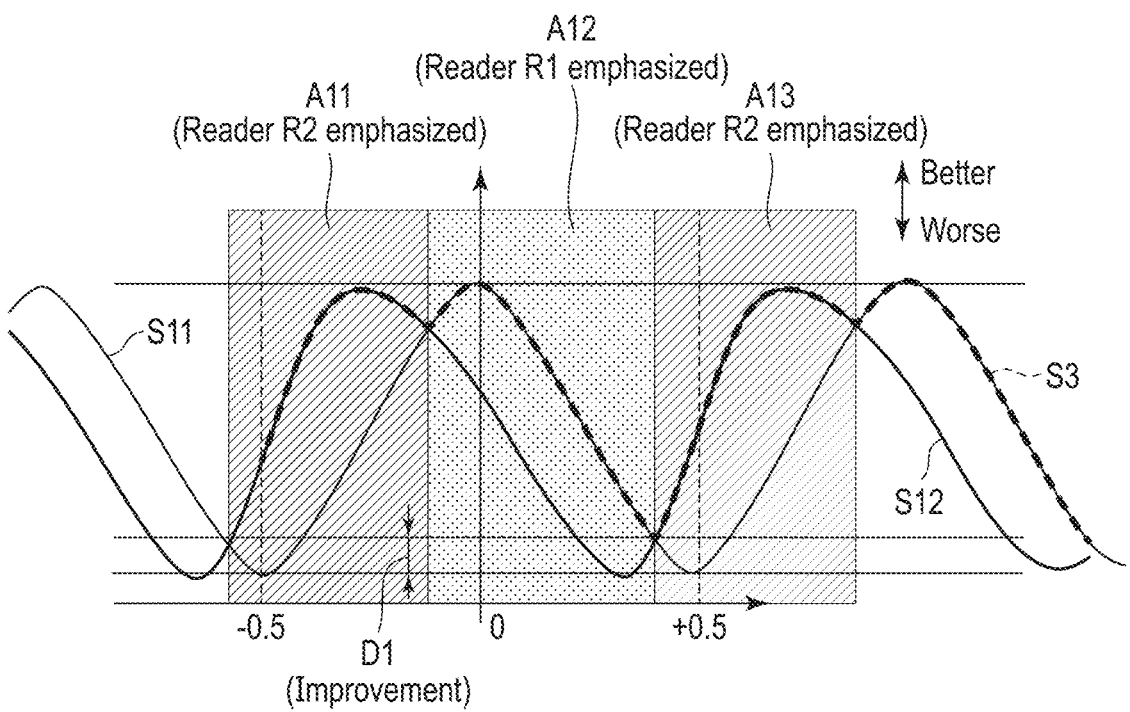
FIG. 10 illustrates an example of a synthesis pattern in a radius position of the embodiment.

FIG. 10 illustrates an example of synthesis pattern at the radius position R10. In FIG. 10, the vertical axis is a position linearity which becomes better in the upper side and worse in the lower side. The generation waveform S11 is generated by the reader R1, and the generation waveform S12 is generated by the reader R2. The waveform S3 is synthesis of the generation waveforms S11 and S12. When generating the waveforms S3, the MPU 14 changes a mixture ratio of the genera-ion waveform (position signal) S11 of the reader R1 and the generation waveform (position signal) S12 of the reader R2 to improve the position linearity. Specifically, as in FIG. 10, the MPU 14 changes emphasized generation waveforms as in area A11 (reader R2 is emphasized), area A12 (reader R1 is emphasized), and area A13 (reader R2 is emphasized). With such a change, the synthesized waveform becomes the waveform S3, and the position linearity is improved by an improvement degree D1. Note that a synthesis ratio (synthesis coefficient α) of synthesizing the generation waveforms S11 and 312 in the radius position R10 will be described later.

FIG. 11 illustrates an example of synthesis pattern in the radius position R20. In FIG. 11, the vertical axis is the position linearity, and the generation waveforms S11 and S12, and the waveform S3 are as in the example of FIG. 10. At the radius position R20, when generating the waveform S3, the MPU 14 changes mixture ratio of the generation waveform (position signal) 311 of the reader R1 and the generation waveform (position signal) S12 of the reader R2 to improve the position linearity. As in FIG. 11, the MPU 14 changes emphasized generation waveforms as in area A21 (reader R1 is emphasized), area A22 (reader R2 is emphasized), and area A23 (reader R1 is emphasized). With such a change, the synthesized waveform becomes the waveform S3, and the position linearity is improved by an improvement degree D2. Note that a synthesis ratio (synthesis coefficient α) of synthesizing the generation waveforms S11 and S12 in the radius position R20 will be described later.

FIG. 12 illustrates an example of synthesis pattern in the radius position R30. In FIG. 12, the vertical axis is the position linearity, and the generation waveforms S11 and S12, and the waveform S3 are as in the example of FIG. 10. At the radius position R30, when generating the waveform S3, the MPU 14 changes mixture ratio of the generation waveform (position signal) S11 of the reader R1 and the generation waveform (position signal) S12 of the reader R2 to improve the position linearity. As in FIG. 12, the MPU 14 changes emphasized generation waveforms as in area A31 (reader R2 is emphasized), area A32 (reader R1 is emphasized), and area A33 (reader P2 is emphasized). With such a change, the synthesized waveform becomes the waveform S3, and the position linearity is improved by an improvement degree D3. Note that, a synthesis ratio (synthesis coefficient $\alpha$) of the radius position R30 is, as indicated in the lower side of the figure, 1 or 0 (that is, only one generation waveform is used). Specifically, the MPU 14 adopts the generation waveform S12 alone in the area A31, the generation waveform S11 alone in the area A32, and the generation waveform S12 alone in the area A33 in order to obtain the waveform S3. That is, a synthesis method to adopt only one of the waveforms S11 and S12 depending on the position of rDiff(r) may be used.

Figure 13:
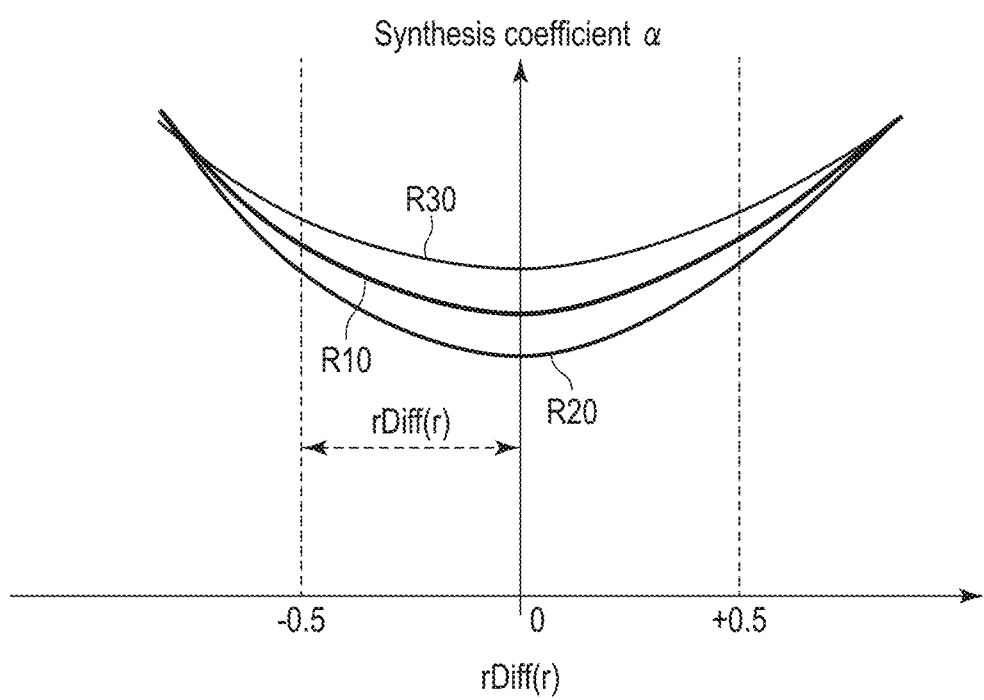
FIG. 13 illustrates an example of a synthesis coefficient α of the embodiment.

Now, synthesis coefficient $\alpha$ will be explained. FIG. 13 illustrates an example of the synthesis coefficient $\alpha$. In FIG. 13, the horizontal axis indicates the aforementioned rDiff(r), and the vertical axis indicates the value of synthesis coefficient $\alpha$. As in FIG. 13, the synthesis coefficient $\alpha$ is defined corresponding to radius positions such as R10, R20, and R30. The synthesis coefficient (function) $\alpha$ corresponding to the radius position is stored in the memory 16.

Figure 14:
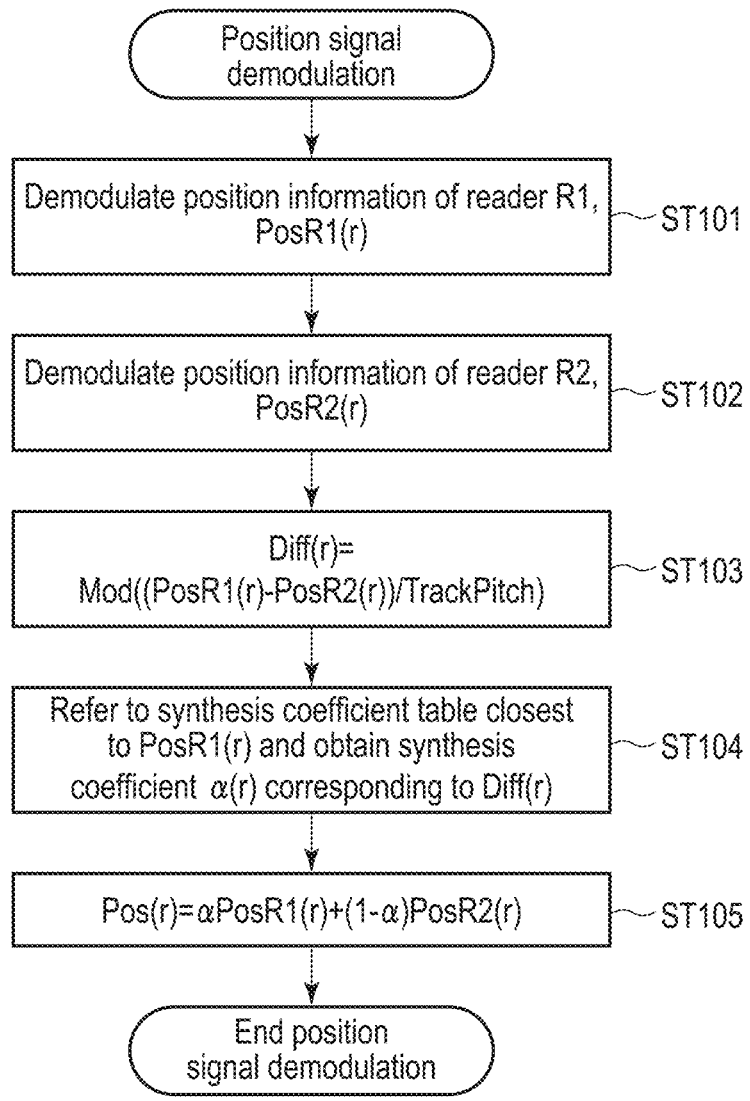
FIG. 14 is a flowchart illustrating an example of a process to demodulate a generation waveform of the embodiment.
Figure 15:
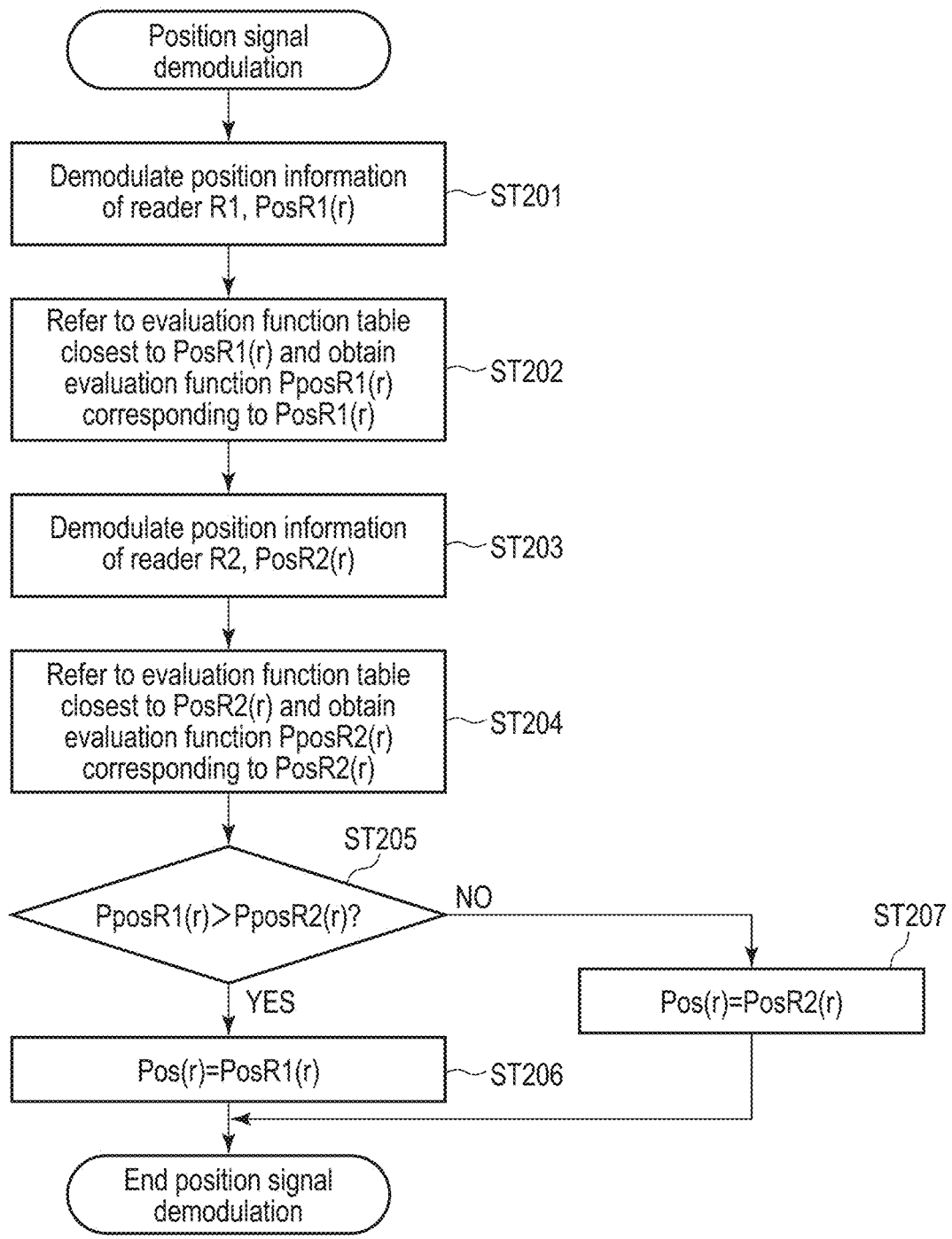
FIG. 15 is a flowchart illustrating an example of a process to demodulate a generation waveform of the embodiment.

FIGS. 14 and 15 are a flow chart of an example of a process to demodulate the generation waveform executed by the MPU 14. The processs executed at each time when servo data are sampled. Furthermore, the process is executed by the reader R1 when a preamble (SSMM) cannot be detected. Initially, the flowchart of FIG. 14 will be explained, and then, the flowchart of FIG. 15 will be explained.

The flowchart of FIG. 14 proceeds as follows.

The MPU 14 demodulates position information of the reader R1 (ST101). That is, the MPU 14 identifies a generation waveform S11 of the reader R1 using preamble (SSMM) of the reader R2 and a shift amount between the readers R1 and R2, identifies BurstA&B included in the generation waveform S11, and demodulates the position information from BurstA&B. Thus, PosR1(r) is obtained. Thus, if preamble (SSMM) cannot be detected by the main reader R1, the magnetic disk device 1 can use preamble (SSMM) of the reader R2, and an error in detecting SSMM can be suppressed. That is, preamble (SSMM) detected by a reader of the readers R1 and R2 which is not affected by a minute error of the magnetic disk 2 can be used. Note that the MPU 14 can acquire a chronological shift amount using the table of FIG. 7.

Then, the MPU 14 demodulates the position information of the reader R2 (ST102). Thus, PosR2(r) is obtained. Step ST102 is basically the same as step ST101 above.

Then the MPU 14 calculates Diff(r)=Mod((PosR1(r)−PosR2(r))/track pitch) (ST103). The MPU 14 refers to a synthetic coefficient table stored in a memory 16 closest to PosR1(r), and obtains synthesis coefficient $\alpha$ (r) corresponding to Diff(r) (=T104). Then, the MPU 14 calculates Pos(r) =$\alpha$Pos(r)+(1−$\alpha$)PosR2(r) (ST105). The MPU 14 executes a demodulation process of position signal as above. For example, the servo generation waveform S11 demodulated by the servo demodulation circuit C1 is synthesized with the waveform S3, servo data D11 can be based on the synthesized servo generation waveform. The MPU 14 executes positioning of the magnetic head 10 based on the servo data D1 to improve the accuracy of positioning of the magnetic head 10.

Now, the flowchart of FIG. 15 will be explained. In this process, synthesis coefficient $\alpha$=1 in an offset position where the characteristics of the reader R1 is better, and synthesis coefficient $\alpha$=0 in an offset position where the characteristics of the reader R1 is worse. That is, the process is performed when the aforementioned pattern of FIG. 12 is used.

As in FIG. 15, the MPU 14 demodulates position information of the reader R1 (ST201). Thus, PosR1(r) can be obtained. Then, the MPU 14 refers to the evaluation function table closest to PosR1, and obtains an evaluation function PposR1(r) corresponding to PosR1(r) (ST202).

Then, the MPU 14 demodulates the position information of the reader R2 (ST203). Thus, PosR2(r) is obtained. Then, the MPU 14 refers to an evaluation function table closest to PosR2, and obtains an evaluation function PposR2(r) corresponding to PosR2(r) (ST204).

As above, the evaluation function of the readers R1 and R2 is obtained, and then, the MPU 14 determines whether or not PposR1(r) is greater than PposR2(r) (ST205). Note that, in this example, greater PposRx(r) has better characteristics. Rx is an optional reader. If PposR1(r) is determined to be greater than PposR2 (Yes in ST205), the MPU 14 determines Pos(r)=PosR1(r) (ST206). On the other hand, PposR1(r) is not determined to be greater than PposR2(r) (No in ST205), the MPU 14 determines Pos(r)=PosR2(r) (ST207). The demodulation process of the position signal is executed by the MPU 14. Thus, a function with a better position linearity is adopted from the generation waveforms S11 and S12 based on a radius position, and the synthesized waveform S3 can be obtained.

Note that, in switching between Pos1(r) and Pos2(r), a transient may occur. Thus, in the proximity of the switching offset position, e may be set to a value less than 1 to reduce the influence. Furthermore, if a value of rDiff(r) is great (for example, there is a distance above several tracks), unevenness in the track pitch may affect, and thus, the proportion of Pos2(r) may be reduced, and at that time, the MPU 14 may stop write operation.

Through the above process, even if preamble (SSMM) cannot be detected by the reader R1, the magnetic disk device 1 can identify preamble of generation waveform S11 by the reader R1 using preamble (SSMM) and a shift amount of the reader R2, synthesize the identified servo generation waveform S11 and generation waveform S12 by the reader R2 based on a radius position, and identify the position information from BurstA&B of the synthesized waveform. Thus, the magnetic disk device 1 can improve the quality of positioning of the servo generation waveforms. Furthermore, since the generation waveforms S11 and S12 can be synthesized with suitable proportion at a radius position demodulated by the readers R1 and R2, unevenness in the track pitch caused by STW can be suppressed, and an influence of noise caused by asymmetry of upper and lower parts of the BurstA&B signal can be suppressed.

Figure 16:
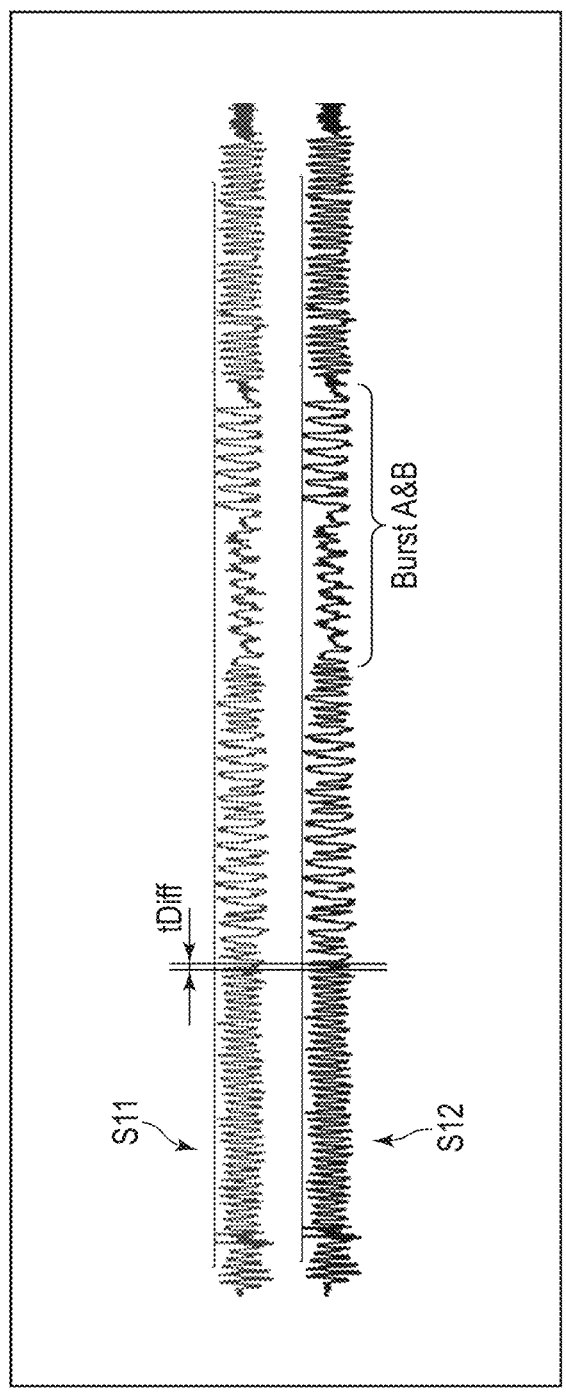
FIG. 16 illustrates shortening a length of BurstA&B part of the embodiment.

Furthermore, since the quality of positioning can be improved, the BurstA&B parts of the servo generation waveforms S11 and 312 can be shortened. FIG. 16 illustrates shortening a length of BurstA&B part. With the aforementioned synthesis process, even if the BurstA&B part is shortened, the quality of positioning can be improved, and the position information can be identified. Thus, the magnetic disk device 1 can improve the efficiency of formatting the magnetic disk 2 by the shortened length of the BurstA&B part.

Furthermore, as described above, is preamble (SSMM) of the reader R1 cannot be detected, the MPU 14 may decrease the synthesis ratio of the reader by which SSMM cannot be detected.

Figure 17:
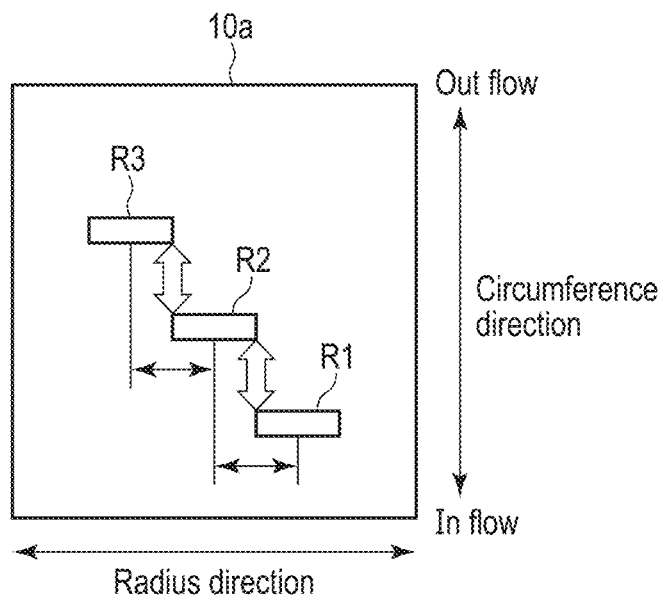
FIG. 17 illustrates an example of a variation of the arrangement of readers of the embodiment.
Figure 18:
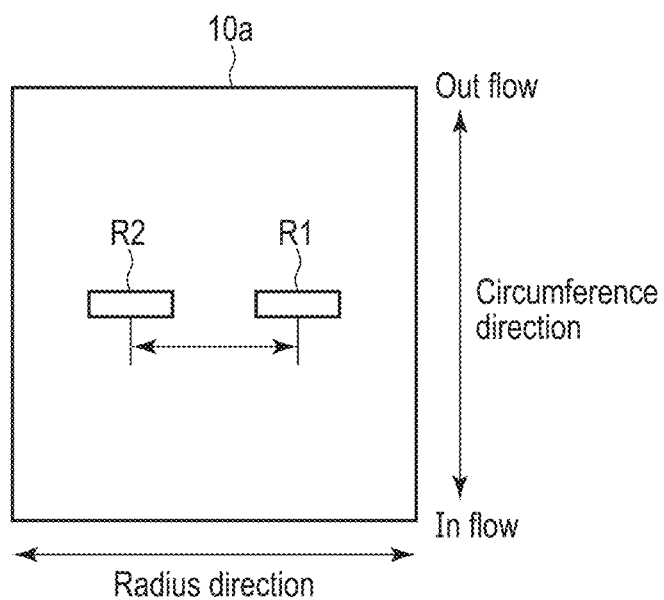
FIG. 18 illustrates an example of a variation of the arrangement of readers of the embodiment.

In the above embodiment, the magnetic head 10 includes the readers R1 and R2; however, the number of readers of the magnetic head 10 is not limited two. Variations of reader arrangements will be explained. FIGS. 17 to 19 illustrate variations of arrangements of the readers. FIG. 17 illustrates three readers R1, R2, and R3, where the readers R1, R2, and R3 are shifted from each other in the circumference and radius directions. In that case, time data, evaluation data, and a gap between readers of each reader are measured with respect to the main reader, and stored in the memory 16. In performing the aforementioned process, which time data and gap between readers should be used will ne determined based on the data with better evaluation data, for example. Furthermore, in the embodiment, the readers P1 and R2 are shifted from each other in the circumference and radius direction; however, shifting in the position is not limited thereto. The readers R1 and R2 may be shifted in the circumference direction of the magnetic disk 2 but not in the radius direction as in FIG. 18. Or, the readers R1 and R2 may be shifted in the radius direction but not in the circumference direction as in FIG. 19. With such a structure of the magnetic head 10, the magnetic disk device 1 can achieve the same advantages as in the embodiment.

Furthermore, in the present embodiment, the reader R1 which first reads servo data chronologically is a main reader; however, a main reader is not a reader which first reads servo data chronologically. For example, quality of reading of servo data of each of the readers R1 and R2 is measured, and the reader with better quality of reading may be used as the main reader.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would tall within the scope and spirit of the inventions.

What is claimed is:

1. A magnetic disk device, comprising:
   a magnetic disk in which positioning information is recorded;
   a magnetic head including a first reader and a second reader positioned in a different position than the first reader;
   a controller configured to position the magnetic head based on first positioning data obtained by the first reader reading the positioning information; and
   a memory configured to store evaluation data at the time of reading the positioning information by each of the first and second readers corresponding to a radius position of the magnetic disk, wherein
   the controller configured to synthesize the first positioning data and second positioning data obtained by the second reader reading the positioning information based on the evaluation data, and performs positioning of the magnetic head based on the synthesized positioning data.

2. The magnetic disk device of claim 1, wherein the controller determines a synthesis ratio of the first positioning data and the second positioning data based on the evaluation data and synthesize the first positioning data and the second positioning data based on the determined synthesized ratio.

3. The magnetic disk device of claim 2, wherein the memory further stores time data indicative of a result of measurement of a shift in times to start reading the positioning information between the first reader and the second reader corresponding to a radius position of the magnetic disk, and
   if the first positioning data cannot be detected from the positioning information read by the first reader, the controller identifies the first positioning data from the positioning information read by the first reader based on a radius position of the magnetic disk indicated by the second positioning data and the time data stored in the storage, and performs positioning of the magnetic head based on the identified first positioning data.

4. The magnetic disk device of claim 3, wherein a state where the controller tails to identify the first positioning data means that a first detection signal included in the first positioning data to detect the first positioning data cannot be detected.

5. The magnetic disk device of claim 4, wherein, if the first detection signal to detect the first positioning data cannot be detected, the controller identifies the first positioning data from data read by the first reader based on a second detection signal included in second positioning data detected by the second reader to detect the second positioning data, a radius position of the magnetic disk indicated by the second positioning data, and a shift amount indicated by the time data.

6. The magnetic disk device of claim 5, wherein, if the first positioning data are identified based on the second detection signal read by the second reader, the controller decreases the synthesis ratio of the first positioning data.

7. The magnetic disk device of claim 1, wherein the magnetic head includes a writer to write data to the magnetic disk, and
   the controller stops write to the magnetic disk by the writer if a gap between the first reader and the second reader is greater than a predetermined value.

8. The magnetic disk device of claim 1, wherein the first reader is a reader to first read the positioning information chronologically than the second reader.

9. The magnetic disk device of claim 1, wherein the first reader is a reader having a better detected reading quality of the positioning information than the second reader.

10. The magnetic disk device of claim 1, wherein the first reader and the second reader are arranged on a recording surface of the magnetic head to be shifted from each other in a peripheral direction and/or a radius direction of the magnetic disk.

* * * * *